Sept. 3, 1935.  R. CHILLINGWORTH  2,012,989
ROTATING WING SYSTEM, PROPELLER OR LIFTING SCREW FOR AIRCRAFT
Original Filed June 23, 1931
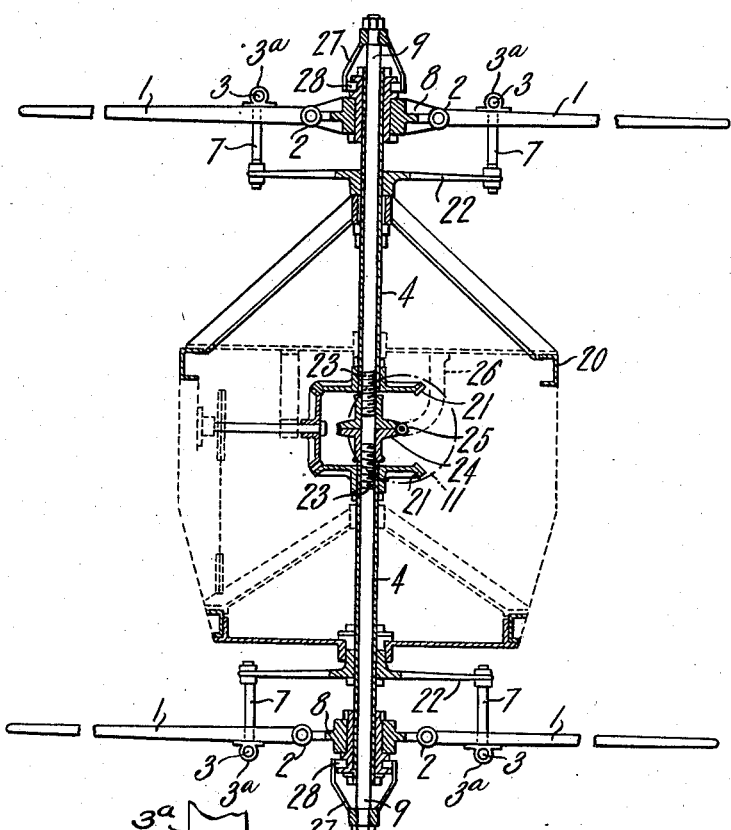
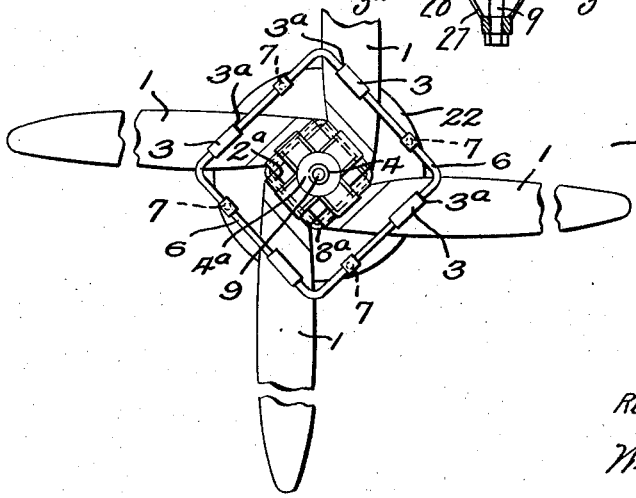
INVENTOR
*RUDOLPH CHILLINGWORTH*
BY
William F. Nickel
ATTORNEY Patented Sept. 3, 1935

2,012,989

UNITED STATES PATENT OFFICE 2,012,989

ROTATING WING SYSTEM, PROPELLER OR LIFTING SCREW FOR AIRCRAFT

Rudolph Chillingworth, Brooklyn, N. Y.

Original application June 23, 1931, Serial No. 546,401. Divided and this application September 30, 1932, Serial No. 635,653. Renewed May 13, 1935. In Great Britain August 2, 1930

8 Claims. (Cl. 170—164)

This invention relates to improvements in rotating wing systems, propellers or lifting screws for aircraft and more particularly to systems in which each wing, plane or blade is obliquely pivoted with its major axis at an angle in respect to an axis about which it is adjustable for the purpose of producing a change of pitch under manual control during flight.

The object of the invention is to provide an improved rotating wing system of the kind referred to which will provide for the control of lift during flight.

According to the invention a compound rotating wing system composed of two or more rotating systems of wings, planes or blades which are obliquely pivoted for pitch adjustment as hereinbefore specified is provided with driving means for rotating said systems of wings, planes or blades in axial alignment, and a single means for manual control of pitch of said wings, planes or blades common to said systems and for use during flight.

I am aware that it has been proposed heretofore to provide rotating wing systems in which two or more systems of wings, planes or blades were provided with driving means for rotating them in axial alignment and were capable of pitch adjustment by the action of a single manual control common to said systems and for use during flight, and I make no claim to such an arrangement except when combined with wing systems in which the wings, planes or blades are obliquely pivoted for pitch adjustment as hereinbefore specified.

In the preferred form of construction of a compound rotating wing system in accordance with my invention, each of the systems of wings, planes or blades comprises a plurality of wings, planes or blades which are obliquely mounted with their major axes at an angle in respect to their axes around which they are adjustable, the said axes round which the wings, planes, or blades are adjusted forming the sides of an angular figure having an even or odd number of sides, in the case of the angle being 45°, said figure being a square.

Two or more sets of rotating wing systems of variable pitch may be arranged to rotate in the same direction or in opposite directions about vertical axes and an aircraft may have two such rotating wing systems arranged either both above the fuselage or body of the aircraft, or one above and one below the same.

An example of a compound rotating wing system constructed and arranged in accordance with the invention is illustrated in the accompanying drawing in which:

Figure 1 shows the invention with rotating wing or blade systems revolving in opposite directions with a common pitch control, and Figure 2 is a top plan view of the construction shown in Figure 1.

On the drawing the same numerals of reference identify the same parts throughout.

This application is a division of my prior application Serial No. 546,401, filed in the United States Patent Office June 23, 1931, and originally entitled Lifting screws for aircraft; upon which application for patent was first filed in Great Britain on August 2, 1930; my said prior application being filed in the United States under the international convention. This divisional application is made to protect separately so much of the invention disclosed in my said prior United States application as relates to the use of a plurality of such lifting screws or propellers, and means for operating and adjusting same.

Referring to the drawing it will be observed that the bearing 3 of each wing, plane or blade (hereinafter referred to as the blade) is mounted obliquely on said blade 1, and each of the said blades with its bearing 3 is adjustably mounted on one of the axes which form the square frame of axes 6 (Figure 2) which is called the outer square frame. There is a second, the inner square frame 8 of axes 8a, bearings 2a mounted also on the blades 1 being provided on the axes 8a of the inner square frame 8. Owing to this construction the ends of the front and rear edges of the blade equidistant from the main axis of rotation are situated at different radial distances from the axis about which the blade is adjustable and will move at different circumferential speeds during adjustment, and this difference effects a change of pitch when adjustment of the blades is made by tilting each blade about its axis 3.

As shown in the drawing there are two rotary wing systems each of which is carried on a hollow rotary shaft 4.

A plate 22 is mounted fast on each shaft 4 and carries on posts or bars 7 upstanding from the plate 22 the square tubular frame 6. The tubular sides of this outer square frame 6 are the axes for the bearings 3 of the blades 1 which latter are adjustably mounted each to one of said axes, the blades being disposed obliquely to the sides of the center square frame 8 so as to provide the necessary oblique movement to obtain the hereinbefore mentioned differing circumferential speeds of the front and rear edges of the blades remote from the center of rotation.

The square control frame 8 formed by its axes 8a which latter are turnably mounted in bearings 2a on the ends 2 of the blades is similar in shape to the outer square frame 6 and has its sides parallel to the sides of the square 6.

The frame 8 carrying axes 8a is mounted to rotate with the shaft 4 and is axially mobile upon the shaft 4. A center shaft 9 passes concentrically through the hollow shaft 4.

The compound unit consisting of the two systems of rotating wings 1 is mounted into the aircraft body 20 as shown, the rotary shaft 4 being divided into two sections each driven by bevel gear 21 as shown. The center shaft 9 is also divided and the inner ends of this shaft have right and left hand threads 23 cut respectively engaging a rotary nut 24 likewise having two oppositely cut threads. The rotary nut 24 is externally worm toothed and moved by a worm wheel 25 through a control wheel 11 supported by a bracket 26. In order to convey axial motion from the shafts 9 to the frames 8, the outer ends of the shafts 9 carry arms 27 connected to a race 28 which enables the said inner race to rotate and move the frame 8 axially. In operation, the blades 1 being set in motion through the gear shown, the pilot may be actuating the hand wheel 11 alter the position of the frame 8 on the driving shaft 4 and in so doing causes the blades to tilt and thereby change their pitch.

The shifting of the frames 8 can also be done by joint connections to the frames below the plates 22 instead of above.

Having described my invention, what I believe to be new and desire to secure and protect by Letters Patent of the United States is:

1. A compound rotating wing system of propellers or lifting screws for aircraft comprising an outer frame the sides of which form axes, rotary means for driving said frame, a similar inner frame mounted to rotate concentrically with said outer frame and adjustable axially relative thereto, and a plurality of wings or blades each of which is pivotally mounted on one of the axes provided by said outer frame in such a way that said axis extends obliquely to the longitudinal axis across the length of said blade, which latter is pivotally united at its inner end to the corresponding side of the inner frame, each wing or blade being thus supported by one side of the outer frame and the corresponding side of the inner frame.

2. In a compound rotating wing system, propeller or lifting screw, comprising a frame of which the sides form axes, a plurality of obliquely mounted blades, each of which is pivoted with one axis of said frame, said axes extending obliquely across the longitudinal axes of said blades, the blades being adjustable around said axes of the frame by tilting the blades to change their pitch for varying the angle of incidence of the blades.

3. In a compound rotating wing system propeller or lifting screw for aircraft, comprising an open frame, the sides of which form axes, a plurality of obliquely mounted blades each of which is pivoted with one axis of the said frame, the latter firmly connected to a driving element, the said axes extending obliquely to the longitudinal axis of said blade, a member encompassed by said frame and obliquely connected to each blade within said frame, means for shifting said member to adjust the blades about said axes of the frame, a driving element and pillars uniting said element to each blade, connected to the sides of said member, to rotate the frame, said member and said blades.

4. In a compound rotating wing system, propeller or lifting screw for aircraft, a plurality of wings, planes or blades and a doubly supporting angular structure formed by a plurality of axes to a pair of open frames of different size, means to connect the wings or blades obliquely, each in cooperation with one pair of the parallel axes of the said frames, situated always, each pair on one side of the said frames; the said axes extending by pairs and parallel one to the other in a transverse oblique direction across the longitudinal axis of one of the wings or blades for a double support for the blades against air pressure and for blade pitch adjustment.

5. In a compound rotating wing system, propeller or lifting screw, the combination of two open frames, the sides of which form axes, a plurality of wings, planes or blades obliquely hinged adjacent one of its ends, each with one of its pivoting axes of said frames to produce a cooperative oblique hinge mounted for pitch adjustment of the blades of said frames, the said pivoted axes extending each in a transverse oblique direction across one of the blades at an angle for pitch adjustment; a second open frame pair of which each frame is encompassed by one of the first said frames, a plurality of wings, planes or blades, each obliquely hinged with the inner end of a blade, with one of its pivoting axes of the second named frames, the oblique hinge mounted to adjust the blades to change their pitch in cooperation with its pivoted axes, said axes extending in a transverse oblique direction across the wings or blades at an angle for pitch adjustment; connections comprising separate aligned shafts, joined to each of said second named frames, means uniting said shafts and to cause shifting of said second named frames to effect adjustment of said wings or blades about said axes, a plate or wheel adjacent each of said frames and joined to the sides thereof, shafts encircling the first said shafts and connected to said plates or wheels and gearing connected to the first said shafts to enable them to be rotated and cause rotation of all of said frames and said wings or blades, whereby the systems rotate in opposite direction.

6. In a rotating wing system, propeller or lifting screw, a main axis, a driving element, a frame secured thereon, providing axes and a member surrounded by said frame all rotating concentrically with the main axis, a plurality of wings, planes or blades, means to connect the blades obliquely with the axes of the said frame and for an oblique connection too of each blade end to the axes of said member, said axes extending obliquely across the blade for pitch adjustment.

7. In a compound rotating wing system, propeller or lifting screw, the combination of two open frames, the sides of which form bearing axes, one bearing mounted obliquely on each of the wings, planes or blades each of which is mounted adjacent one of its ends with its major axis at an angle to the axis about which it pivots, the said pivoting axes extending each in a transverse oblique direction across one of the wings or blades at an angle for pitch adjustment; a second open frame pair, each frame encompassed by one of the first said frames and the obliquely disposed wings or blades pivotally mounted each with its inner end with its major axis at an angle to its pivoting axis, which latter extends in a transverse oblique direction across the wings or blades at an angle for pitch adjustment; connections comprising separate aligned shafts, joined to each of said second named frames, means uniting said shafts and to cause shifting of said second named frames to effect adjustment of said wings or blades about said axes, a plate or wheel adjacent each of said frames and joined to the sides thereof, shafts encircling the first said shafts and connected to said plates or wheels and gearing connected to the first said shafts to enable them to be rotated and cause rotation of all of said frames and said wings or blades, whereby the systems rotate in opposite directions.

8. A compound rotating wing system, propeller or lifting screw for aircraft comprising an outer frame the sides of which form axes, rotary means for driving said frame, a similar inner frame mounted to rotate concentrically with said outer frame and adjustable axially relative thereto, and a plurality of obliquely disposed wings or blades each of which is pivotally mounted on one of the axes provided by said outer frame in such a way that said axis extends in a transverse oblique direction across the longitudinal axis of said blade, at an angle for pitch adjustment, said blade being pivotally united at its inner end to the corresponding side of the inner frame, each wing or blade being thus supported by one side of the outer frame and the corresponding side of the inner frame.

RUDOLPH CHILLINGWORTH.